United States Patent [19]

Ohta

[11] 4,437,390
[45] Mar. 20, 1984

[54] POWER-SERVO BOOSTER

[75] Inventor: Ryuji Ohta, Saitama, Japan

[73] Assignee: Jidosha Kiki Co., Ltd., Tokyo, Japan

[21] Appl. No.: 269,438

[22] Filed: Jun. 2, 1981

[30] Foreign Application Priority Data

Jul. 25, 1980 [JP] Japan .......................... 55-105316[U]

[51] Int. Cl.³ ............................. F16J 1/10; F15B 9/10
[52] U.S. Cl. ...................................... 92/84; 91/369 A
[58] Field of Search ............. 91/369 A, 369 B, 369 R; 60/554; 92/84

[56] References Cited

U.S. PATENT DOCUMENTS 3,132,567  5/1964  Ingres et al. ...................... 91/369 A
4,267,766  5/1981  Horsting ........................... 91/369 A Primary Examiner—Paul E. Maslousky
Attorney, Agent, or Firm—Sughrue, Mion, Zinn, Macpeak & Seas

[57] ABSTRACT

A power-servo booster having a shortened overall length and lighter weight. A fitting member disposed within a connection hole in a power piston is cylindrically formed and a reaction disk is disposed within the cylindrical fitting member. An annular groove is formed in an outer periphery at the bottom of the connection hole and the power piston. A portion of the power piston within the annular groove projects towards the push rod and the reaction disk disposed within the fitting member is placed within the connection hole so that it can contact with an end surface of the projecting portion. The peripheral end of the fitting member is adapted to fit within the annular groove. An annular gap is formed between the fitting member and the bottom of the annular groove to allow for deformation of the reaction disk.

4 Claims, 2 Drawing Figures

POWER-SERVO BOOSTER

BACKGROUND OF THE INVENTION

The present invention relates to a power-servo booster such as a brake booster, a clutch booster or the like. In particular, the invention relates to an improved reaction force mechanism of a power-servo booster.

As a reaction force mechanism in a power-servo booster of this kind, there has conventionally been known a type as shown in FIG. 1. Such a mechanism is described, for instance, in U.S. Pat. No. 3,110,031. In FIG. 1, reference numeral 1 denotes a push rod composed of a rod 2 and a fitting member 3 fastened to one end of the rod by brazing, welding or the like. The fitting member 3 is slidably fitted in a connection hole 5 which is bored in a power piston 4. Reference numeral 6 denotes a reaction disk positioned at the bottom of the connection hole 5. The reaction force which is transmitted from a master cylinder (not shown) to the push rod 1 is transmitted via this reaction disk 6 to a plunger 7. The force is then felt by a driver as a foot pedal force via an input shaft 8.

As a way of decreasing the fuel consumption of a vehicle, it has been required to reduce the size of the booster mounted on a vehicle as well as the weight thereof. In view of this requirement, various techniques have been proposed, for example, to reduce the thickness of the shell constituting the booster or the power piston or modify the construction thereof. However, in order to obtain a desired reaction force, in the reaction force mechanism of FIG. 1, the reaction disk 6 is provided at the bottom of the connection hole 5 and the fitting member 3 of the push rod 1 is positioned in contact with the reaction disk 6 so as to allow relative movement thereof with respect to the connection hole 5 through a predetermined distance. Therefore, the length of this connection hole 5 in the axial direction is the sum of the thicknesses of the fitting member 3 and the reaction disk 6. Thus, the length of the power piston in the axial direction must necessarily include some surplus length. Under these circumstances, it has been difficult to shorten the length in the axial direction.

SUMMARY OF THE INVENTION

In view of the above, an object of the present invention is to reduce the size and weight of the booster as well as of the reaction force mechanism.

In accordance with the present invention, a power-servo booster meeting these and other objects is provided. In the power-servo booster of the invention, a fitting member is composed of a push rod formed as a cup-shaped cylinder with a reaction disk fitted in the cup-shaped cylindrical member. At the bottom of a connection hole in a power piston is formed an annular groove into which the cylindrical end of the fitting member may be fitted and the portion within the annular groove is made to project. The fitting member is fitted into the connection hole and the reaction disk is in contact with the end surface of the projected portion. Between this end surface of the fitting member and the bottom of the annular groove is formed an annular gap which allows for deformation of the reaction disk. The outer diameter of the cup-shaped fitting member is equal to the inner diameter of the connection hole so that the cup-shaped fitting member is fitted with the hole to thus reduce the overall axial length.

DESCRIPTION OF THE PREFERRED EMBODIMENTS

Figure 1:
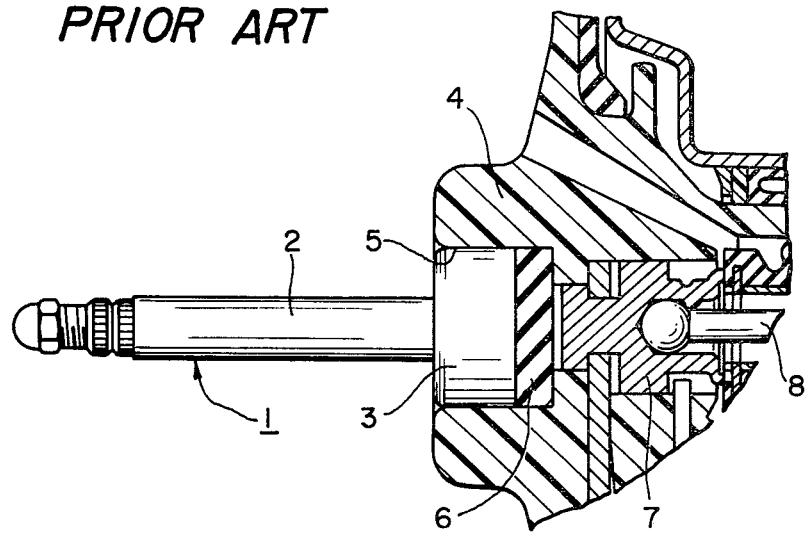
FIG. 1 is a cross-sectional view showing a conventional reaction force mechanism in a power-servo booster.
Figure 2:
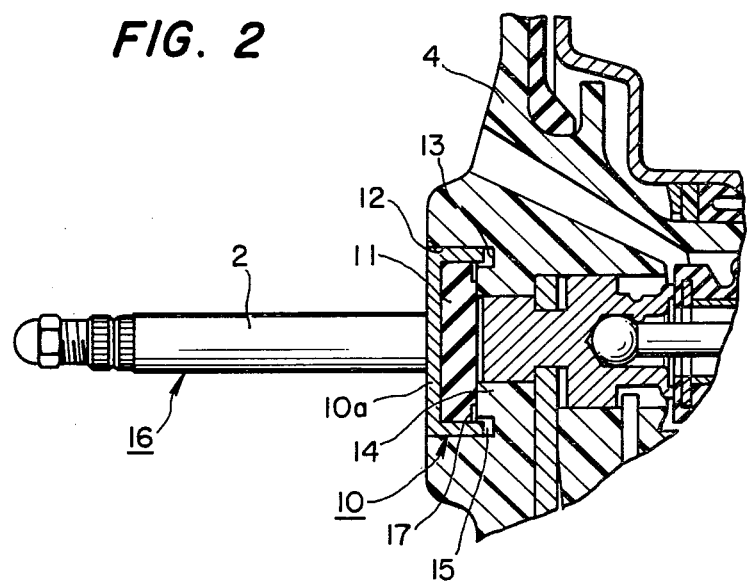
FIG. 2 is a cross-sectional view showing a preferred embodiment of a reaction force mechanism in a power-servo booster in accordance with the present invention.

In FIG. 2, reference numeral 10 denotes a generally cylindrically-shaped fitting member having a closed disk-shaped bottom 10a. The outer surface of the bottom 10a is coupled to a rod 2. A reaction disk 11 is provided inside the cylindrical fitting member 10. The fitting member 10 in which the reaction disk 11 is provided is slidably fitted in a connection hole 12 formed in a power piston 4. In the outer periphery at the bottom of this connection hole 12 is formed an annular groove 13 into which the end of the fitting member 10 may be inserted. The reaction disk 11 is elastically set against the end surface of a projecting portion 14 which is formed within the annular groove 12. In the position in which the reaction disk 11 is elastically set against the projecting portion 14, an annular gap 15 is formed between the end of the fitting member 10 and the bottom of the annular groove 13 so as to allow the deformation of the reaction disk 11 when the push rod 16 approaches the power piston 4. A ring-shaped plate 17 having the same outer diameter as the inner diameter of the fitting member 10 is provided so as to be in contact with the outer peripheral portion when the reaction disk 11 and the projected portion 14 are in contact with each other.

In order to further reduce the overall axial length, modifications to this structure may be made. That is, the cup-shaped fitting member 10 can be formed to have an inner diameter equal to the outer diameter of the projection 14 so as to provide fitting engagement therebetween. However in this case, since the fitting area is smaller than that of the fitting engagement region between the outer peripheral surface of the fitting member 10 and the inner peripheral surface of the connection hole 12, stabilized operation may not be carried out.

In accordance with the present invention as mentioned above, the reaction disk 11 is provided in the fitting member 10 which is formed as a cylinder having a closed bottom end. As a result, the overall length of the push rod 1 can be made short in comparison with the prior art construction. In addition, the depth of the connection hole 12 can be made substantially equal to the length of the fitting member 10 in the axial direction. Therefore, the length of the power piston 4 in the axial direction can also be made shorter. Furthermore, due to the provision of the ring-shaped plate 17, the reaction disk 11 is prevented from being subjected to any damage. Specifically, during operation of the power-servo booster, the push rod 16 effects a reciprocating motion relative to the power piston 4. Due to this motion, when the reaction disk 11 is repeatedly subjected to a load, the outer peripheral part of the disk is prevented from being deformed and projecting into the annular groove 13. Thus, no damage can be caused by the outer peripheral surface of the projected portion 14 or the like. However, in a case where there is no danger that the reaction disk 11 will be deformed and project into the annular groove 13, it is not necessary to provide the ring-shaped plate 17.

The reaction disk 11 is elastically fitted with the fitting member 10 so that sealing engagement is provided therebetween. On the other hand, the outer surface of the fitting member 10 and the inner surface of the connection hole 12 have metal-to-metal contact so that minute fluid communication can be performed therebetween. During assembly, air may be confined within a space defined between the cup-shaped fitting member 10 and the reaction disk 11. This could not escape if the fitting member 10 and the disk 11 were to be tightly sealed. In this regard, at least one air-leakage passage may be provided if desired. The air-leakage passage can be formed in an outer peripheral surface of the reaction disk 11 or the inner peripheral surface of the fitting member 10 along the axial direction of the piston. Alternatively, an air-leakage passage may be formed at the bottom plate portion of the fitting member to provide fluid communication between the inside and outside of the fitting member 10. Upon completion of the assembly of the reaction disk 11 with the fitting member 10, no air is present between the bottom portion of the fitting member and the reaction disk 11.

In accordance with the present invention, as mentioned above, the length in the axial direction of the reaction force mechanism in the power-servo booster is made shorter in comparison with the prior art device. Thus, the overall size and weight of the power-servo booster are reduced.

What is claimed is:

1. In a power-servo booster wherein a fitting member provided at the end of a push rod is slidably fitted in a connection hole in a power piston and reaction force which acts on the push rod is transmitted to an input shaft via a reaction disk, the improvement wherein:

said fitting member is made cylindrical and cup-shaped and has a closed disk-shaped bottom over an entire cross-section of said fitting member in a plane extending through a central axis of said fitting member;

said reaction disk is disposed within said cylindrical fitting member;

an entire outer cylindrical surface of said reaction disk is completely surrounded by an inner cylindrical surface of said fitting member;

an annular groove is formed in an outer periphery at the bottom of said connection hole in said power piston;

a portion of said power piston within said annular groove projects toward said push rod;

said fitting member in which said reaction disk is disposed is fitted into said connection hole so that said reaction disk can contact with an end surface of the projecting portion of said power piston and a peripheral end of said fitting member can fit into said annular groove; and an annular gap is formed between said fitting member and the bottom of said annular groove to allow for deformation of said reaction disk.

2. The power-servo booster of claim 1 wherein a ring-shaped plate is provided at a radial surface of said reaction disk adjacent said projecting portion of said power piston, said ring-shaped plate having an outer diameter substantially equal to the inner diameter of said fitting member, an outermost peripheral portion of said ring-shaped plate confronting and contacting an outermost peripheral portion of said radial surface of said reaction disk to prevent said outermost peripheral portion of said radial surface of said reaction disk from entering said annular gap.

3. The power-servo booster of claim 1 wherein said projection portion and said input shaft are adjacent each other and form a continuous surface facing a radial surface of said reaction disk.

4. The power-servo booster of claim 3 wherein a ring-shaped plate is provided at said radial surface of said reaction disk adjacent said projecting portion of said power piston, said ring-shaped plate having an outer diameter substantial equal to the inner diameter of said fitting member, an outermost peripheral portion of said ring-shaped plate confronting and contacting an outermost peripheral portion of said radial surface of said reaction disk to prevent said outermost peripheral portion of said radial surface of said reaction disk from entering said annular gap.

* * * * *